US006630421B1

(12) United States Patent
Atobe et al.

(10) Patent No.: US 6,630,421 B1
(45) Date of Patent: Oct. 7, 2003

(54) REACTIVE AGENT AND PROCESS FOR DECOMPOSING FLUORINE COMPOUNDS AND USE THEREOF

(75) Inventors: Hitoshi Atobe, Kanagawa (JP); Toraichi Kaneko, Kanagawa (JP); Yuji Hayasaka, Kanagawa (JP); Shinichi Yano, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,732

(22) Filed: Apr. 28, 2000

Related U.S. Application Data

(60) Provisional application No. 60/156,871, filed on Sep. 30, 1999.

(30) Foreign Application Priority Data

| Nov. 1, 1999 | (JP) | 11-310509 |
| Apr. 28, 1999 | (JP) | 11-122728 |
| Mar. 7, 2000 | (JP) | 2000-062430 |

(51) Int. Cl.$^7$ ................................................. B01J 8/00
(52) U.S. Cl. ............... 502/340; 588/206; 588/218; 588/242; 588/248; 588/901; 502/300; 502/341; 502/352; 423/240 S
(58) Field of Search ............... 502/340, 300, 502/341, 345, 344, 346, 349, 351, 353, 354, 355, 174, 414, 415, 439; 423/240 S; 588/205, 206, 218, 242, 248, 901

(56) References Cited

U.S. PATENT DOCUMENTS

| 4,003,933 | A | * | 1/1977 | Drake | 260/583 K |
| 4,140,720 | A | * | 2/1979 | Drake | 260/586 P |
| 4,422,960 | A | * | 12/1983 | Shiroto et al. | 502/206 |
| 4,631,268 | A | * | 12/1986 | Lachman et al. | 502/439 |
| 4,637,995 | A | * | 1/1987 | DeAngelis et al. | 502/439 |
| 4,657,880 | A | * | 4/1987 | Lachman et al. | 502/64 |
| 4,717,554 | A | * | 1/1988 | Nomura et al. | 588/248 |
| 4,788,174 | A | * | 11/1988 | Arai | 502/324 |
| 4,861,740 | A | * | 8/1989 | Sachtler et al. | 502/66 |
| 4,900,711 | A | * | 2/1990 | Nebesh et al. | 502/228 |
| 5,021,383 | A | * | 6/1991 | Berty | 502/174 |
| 5,024,984 | A | * | 6/1991 | Kaminsky et al. | 502/303 |
| 5,153,165 | A | * | 10/1992 | Lowery et al. | 502/341 |
| RE34,853 | E | * | 2/1995 | DeAngelis et al. | 502/439 |
| 5,561,217 | A | * | 10/1996 | Weyer et al. | 528/410 |
| 5,916,839 | A | * | 6/1999 | Pak et al. | 502/328 |
| 5,935,896 | A | * | 8/1999 | Dupuis et al. | 502/439 |
| 5,981,820 | A | * | 11/1999 | Smith et al. | 585/671 |
| 6,121,189 | A | * | 9/2000 | Campbell et al. | 502/324 |

FOREIGN PATENT DOCUMENTS

| JP | 7-132211 | 5/1995 |
| JP | 10-277363 | 10/1998 |
| JP | 10-286438 | 10/1998 |
| JP | 10-286439 | 10/1998 |
| JP | 11-70322 | 3/1999 |

* cited by examiner

*Primary Examiner*—Steven Bos
*Assistant Examiner*—Anthony Kuhar
(74) *Attorney, Agent, or Firm*—Sughrue Mion, PLLC

(57) ABSTRACT

A reactive agent for decomposing fluorine compounds comprising alumina and an alkaline earth metal compound; a process for decomposing fluorine compounds, comprising contacting the reactive agent with a fluorine compound at a temperature of 200° C. or more; and a process for manufacturing a semiconductor device, comprising an etching or cleaning and a decomposing using the reactive agent.

12 Claims, 1 Drawing Sheet

REACTIVE AGENT AND PROCESS FOR DECOMPOSING FLUORINE COMPOUNDS AND USE THEREOF

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/156,871 filed Sep. 30, 1999 pursuant to 35 U.S.C. §111(b).

FIELD OF THE INVENTION

The present invention relates to a reactive agent and a process for decomposing and detoxifying various fluorine compounds such as chlorofluorocarbons (hereinafter simply referred to as "CFC"), hydrochlorofluorocarbons (hereinafter simply referred to as "HCFC"), perfluorocarbons (hereinafter simply referred to as "PFC"), hydrofluorocarbons (hereinafter simply referred to as "HFC"), perfluoroethers (hereinafter simply referred to as "PFE"), hydrofluoroethers (hereinafter simply referred to as "HFE") and sulfur fluoride, simultaneously with the compounds produced on using these fluorine compounds, for example, in an etching or cleaning step during the process of manufacturing a semiconductor device, such as HF, $SiF_4$ or $COF_2$.

BACKGROUND OF THE INVENTION

Most of the above-described fluorine compounds are generally stable and harmless to the human body, therefore, their use is outspread in various fields. In recent years, the amount of HFC as a refrigerant of car air conditioner or the like and PFC for etching or as a cleaning gas in the process of manufacturing semiconductors is particularly increased. Furthermore, a large amount of sulfur hexafluoride is being used for capacitors, transformers and the like because of its excellent electrical insulating property. These fluorine compounds are a stable compound and in turn have a large global warming potential coefficient. If such a fluorine compound is released as it is into the global environment, there is a fear that its effect continues for a long period of time. In particular, $SF_6$, $CF_4$, $C_2F_6$ and the like are a very stable gas and have a very long life in air. Therefore, on discharge after their use, these gases must be released after decomposition into a harmless substance having no effect on the global environment. As an alternate compound therefor, PFE and HFE are proposed but these also have the same global warming problem. Furthermore, the gas discharged after use in the process of manufacturing semiconductor devices contains gases such as HF, $SiF_4$ and $COF_2$ and these gases must also be released after decomposition into a safe substance together with the above-described compounds.

CFC heretofore used in a large amount as a refrigerant, detergent or the like, and HCFC as an alternate compound thereof cannot be released as it is and must be decomposed into a harmless substance because ozone layer destruction occurs as a serious environmental problem.

Conventionally, as a technique for decomposing such fluorine compounds, for example, (1) a combustion decomposition method of treating the compound together with a fuel (see, WO94/05399), (2) a thermal decomposition method using a reactive agent such as silica or zeolite (see, JP-A-7-116466 (the term "JP-A" as used herein means an "unexamined published Japanese patent application")), and (3) a catalytic decomposition method using an alumina or the like (see, JP-A-10-286434) are known.

However, method (1) is disadvantageous in that generation of $NO_x$ must be controlled during the combustion or a large amount of diluting gas is necessary, causing a decrease in the decomposing ratio, and moreover, a secondary treatment of HF contained in the exhaust gas after the decomposition is necessary. Method (2) also has a problem in that a high temperature of 1,000° C. or more is necessary particularly for decomposing PFC (e.g., $CF_4$, $C_2F_6$) at a sufficiently high rate and moreover, a separate secondary treatment of compounds such as $SiF_4$ contained in the exhaust gas after the decomposition is necessary. According to the method (3), decomposition may be performed at a relatively low temperature as compared with the methods (1) and (2), however, the following problems still remain. For decomposing PFC in an amount of 100%, the supply gas must be diluted with air or the like to reduce the PFC concentration in the gas. Furthermore, in order to bring out the catalytic action of alumina, it is necessary to allow a large amount of steam to be present together and thereby hydrolyze, for example, fluoride or the like accumulated on the alumina surface. Therefore, an anticorrosive material against HF generated by the high-temperature decomposition of fluoride on the alumina surface, and a secondary treatment of HF are necessary.

As such, a method for effectively decomposing fluorine compounds using an industrially advantageous process is heretofore not known and more improvements are demanded.

SUMMARY OF THE INVENTION

An object of the present invention is to solve the above-described problems and provide a reactive agent which can thermally decompose fluorine compounds at a relatively low temperature without adding water and which can fix the decomposition products (e.g., F, $SO_x$) of the decomposed fluorine compound to the reactive agent.

Another object of the present invention is to provide a process for efficiently decomposing particularly PFC which is difficult to decompose.

As a result of extensive investigations to solve the above-described problems, the present inventors have found that these objects can be attained by a reactive agent for decomposing fluorine compounds, comprising alumina and an alkaline earth metal compound. Furthermore, the present inventors have found that in a process for decomposing fluorine compounds, comprising contacting a fluorine compound with the above-described reactive agent at a temperature of 200° C. or more, the fluorine compound can be thermally decomposed, the generated chlorine atoms, fluorine atoms and/or sulfur atoms can be fixed as a chloride, a fluoride and/or a sulfate of an alkaline earth metal in the reactive agent, and if desired, by adding a metal oxide to the reactive agent to incorporate oxygen into the fluorine compound, the carbon monoxide generated can be simultaneously oxidized and thereby detoxified. The present invention has been accomplished based on these findings. The present invention relates to a reactive agent and a process for decomposing fluorine compounds, described in (1) to (28) below:

(1) A reactive agent for decomposing fluorine compounds, comprising alumina and an alkaline earth metal compound;

(2) the reactive agent for decomposing fluorine compounds as described in (1) above, wherein the alumina has a specific surface area of 50 m²/g or more;

(3) the reactive agent for decomposing fluorine compounds as described in (1) or (2) above, wherein the alumina is pseudo boehmite alumina;

(4) the reactive agent for decomposing fluorine compounds as described in (1) or (2) above, wherein the alumina is obtained by baking pseudo boehmite alumina at a baking temperature of from 400 to 1,000° C.;

(5) the reactive agent for decomposing fluorine compounds as described in any one of (1) to (4) above, wherein the alkaline earth metal compound is a carbonate of magnesium, calcium, strontium or barium;

(6) the reactive agent for decomposing fluorine compounds as described in any one of (1) to (5) above, wherein the alumina and the alkaline earth metal compound present in the reactive agent each is in the form of a powder having a particle size of 100 μm or less;

(7) the reactive agent for decomposing fluorine compounds as described in any one of (1) to (6) above, wherein the alumina and the alkaline earth metal compound are present in the reactive agent at a mass ratio of from 1:9 to 1:1;

(8) the reactive agent for decomposing fluorine compounds as described in any one of (1) to (7) above, which contains at least one oxide of a metal selected from the group consisting of copper, tin, nickel, cobalt, chromium, molybdenum, tungsten and vanadium;

(9) the reactive agent for decomposing fluorine compounds as described in (8) above, wherein the content of the metal oxide is, in terms of a ratio to the total mass of the alumina and alkaline earth metal compound, from 1:99 to 5:95;

(10) the reactive agent for decomposing fluorine compounds as described in any one of (1) to (9), which has an alkali metal content of 0.1 mass % or less;

(11) the reactive agent for decomposing fluorine compounds as described in any one of (1) to (10) above, which is a granular product obtained by baking at a temperature of from 400 to 700° C.;

(12) the reactive agent for decomposing fluorine compounds as described in (11) above, which is a granular product having a particle size of from 0.5 to 10 mm;

(13) the reactive agent for decomposing fluorine compounds as described in any one of (1) to (12) above, which has a water content of 1 mass % or less.

(14) the reactive agent for decomposing fluorine compounds as described in any one of (1) to (13) above, wherein the fluorine compound is at least one fluorine compound selected from the group consisting of perfluorocarbon, hydrofluorocarbon, chlorofluorocarbon, hydrochlorofluorocarbon, perfluoroether, hydrofluoroether, fluoroolefin, sulfur fluoride, $SiF_4$ and $COF_2$;

(15) the reactive agent for decomposing fluorine compounds as described in (14) above, wherein the fluorine compound contains hydrogen chloride and/or hydrogen fluoride;

(16) a process for decomposing fluorine compounds, comprising contacting a reactive agent described in any one of (1) to (15) above with a fluorine compound at a temperature of 200° C. or more;

(17) the process for decomposing fluorine compounds as described in (16) above, wherein the fluorine compound concentration in a gas to be treated by contacting it with a reactive agent described in any one of (1) to (15) above is from 0.01 to 10 vol %;

(18) a process for decomposing fluorine compounds, comprising contacting a reactive agent described in any one of (1) to (15) above with a fluorine compound at a temperature of 500° C. or more in the presence of oxygen gas, thereby controlling the generation of carbon monoxide;

(19) the process for decomposing fluorine compounds as described in (18) above, wherein the oxygen gas concentration in a gas to be treated is 20 vol % or less;

(20) the process for decomposing fluorine compounds as described in any one of (16) to (19) above, wherein chlorine atom, fluorine atom and/or sulfur atom produced on contacting a reactive agent described in any one of (1) to (15) above with a fluorine compound are fixed as an alkaline earth metal chloride, an alkaline earth metal fluoride and/or an alkaline earth metal sulfate, respectively;

(21) a process for manufacturing a semiconductor device, comprising an etching or cleaning step of using as an etching gas or cleaning gas at least one fluorine compound selected from the group consisting of perfluorocarbon, hydrofluorocarbon, chlorofluoro carbon, hydrochlorofluorocarbon, perfluoroether, hydrofluoroether, fluoroolefin and sulfur fluoride, and a decomposition step of decomposing the fluorine compound-containing gas discharged from the etching or cleaning step using a reactive agent described in any one of (1) to (15) above;

(22) the process for manufacturing a semiconductor device as described in (21) above, wherein the gas discharged from the etching or cleaning step is a gas containing at least one fluorine compound selected from the group consisting of perfluorocarbon, hydrofluorocarbon, chlorofluorocarbon, hydrochlorofluorocarbon, perfluoroether, hydrofluoroether, fluoroolefin, sulfur fluoride, $SiF_4$ and $COF_2$;

(23) the process for manufacturing a semiconductor device as described in (22) above, wherein the fluorine compound-containing gas contains hydrogen chloride and/or hydrogen fluoride;

(24) the process for manufacturing a semiconductor device as described in any one of (21) to (23) above, wherein in the decomposition step, the fluorine compound in a gas to be treated is decomposed at a temperature of 200° C. or more;

(25) the process for manufacturing a semiconductor device as described in any one of (21) to (24) above, wherein in the decomposition step, the fluorine compound concentration in a gas to be treated is from 0.01 to 10 vol %;

(26) a process for manufacturing a semiconductor device comprising the decomposition step is performed at a temperature of 500° C. or more in the presence of oxygen gas, thereby controlling the generation of carbon monoxide;

(27) the process for manufacturing a semiconductor device as described in (26) above, wherein in the decomposition step, the oxygen gas concentration in a gas to be treated is 20 vol % or less;

(28) the process for manufacturing a semiconductor device as described in any one of (21) to (27) above, wherein chlorine atom, fluorine atom and/or sulfur atom produced in the decomposition step of decomposing the gas discharged from the etching or cleaning step using a reactive agent described in any one of (1) to (15) above are fixed as an alkaline earth metal chloride, an alkaline earth metal fluoride and/or an alkaline earth metal sulfate, respectively.

In summary, the present invention provides "a reactive agent for decomposing fluorine compounds, comprising alumina and an alkaline earth metal compound, which can decompose and detoxify fluorine compounds having a high ozone layer destruction coefficient or a high global warming potential coefficient", "a process for decomposing fluorine compounds, comprising contacting a fluorine compound with the above-described reactive agent at a temperature of 200° C. or more", "a process for decomposing fluorine compounds, comprising incorporating oxygen into a fluorine compound and contacting the fluorine compound with the above-described reactive agent at a temperature of 500° C. or more, thereby controlling the generation of carbon monoxide", and "a process for manufacturing a semiconductor device, comprising an etching or cleaning step and a decomposition step of decomposing a gas containing fluorine compounds discharged from the etching or cleaning step using the above-described reacting agent".

According to the above-described conventional techniques, namely, (1) a combustion decomposition method, (2) a thermal decomposition method using a reactive agent and (3) a decomposition method using an alumina catalyst, the decomposition product of fluorine compounds is a substance still having harmful effect on the environment. Therefore, a treatment for detoxifying the decomposition product must be separately employed in the later stage of the decomposition step. This makes it difficult to downsize the apparatus. In particular, the gases discharged from the manufacturing process of semiconductor devices, for example, PFC exhaust gas used for etching or cleaning contains fluorine compounds such as HF, $SiF_4$ and $COF_2$ in addition to PFC. Accordingly, in the case of the catalytic decomposition method, a treatment for the detoxification of $SiF_4$ and the like is necessary also in the early stage and a complicated and cumbersome apparatus is required. Furthermore, for the decomposition of PFC which is particularly difficult to decompose, a high temperature is necessary but this gives rise to a problem that the material of which the reactor is constructed deteriorates.

On the other hand, according to the present invention, a fluorine compound used for the purpose of electrical insulation, as a refrigerant or in the process of manufacturing semiconductor devices can be efficiently decomposed at a low temperature. In the present invention, the fluorine compound is decomposed simultaneously with $SiF_4$ and the like generated when the fluorine compound is used, for example, in etching. Furthermore, a reaction for fixing and thereby detoxifying, for example, fluorine generated by the decomposition as an alkaline earth metal fluoride (for example, as $CaF_2$) proceeds at the same time. Therefore, the problems in this concern can also be solved.

DETAILED DESCRIPTION OF THE INVENTION

Figure 1:
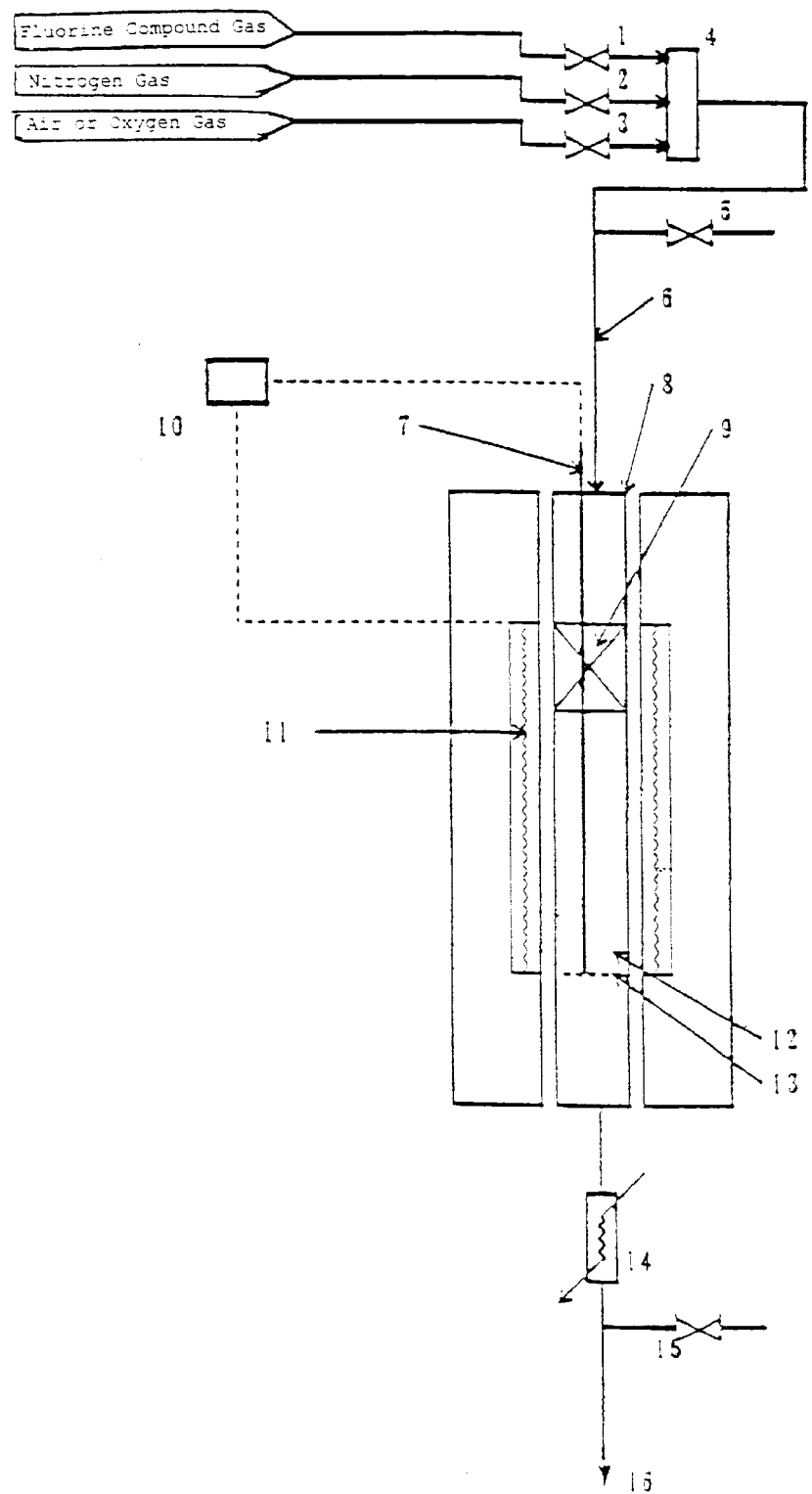
FIG. 1 is a systematic diagram of equipment layout showing one example of the apparatus used in the practice of the present invention.

The present invention is described in detail below.

The fluorine compounds which can be decomposed by the reactive agent of the present invention are described. Examples of CFC include compounds such as $CClF_3$, $CC_{12}F_2$, $CCl_3F$, $C_2Cl_3F_3$, $C_2Cl_2F_4$ and $C_2ClF_5$. Examples of HCFC include compounds such as $CHClF_2$ and $C_2HCl_2F_3$. Examples of PFC include $CF_4$, $C_2F_6$, $C_3F_8$ and $C_4F_8$ (octafluorocyclobutane). Examples of HFC include compounds such as $CH_3F$, $CH_2F_2$, $CHF_3$ and $C_2H_2F_4$. Examples of PFE include compounds such as $CF_3OCF_3$ and $CF_3OCF_2CF_3$. Examples of HFE include compounds such as $CHF_2OCHF_2$, $CHF_2OCH_2CF_3$ and $CH_3OCF_2CF_3$. Examples of sulfur fluoride include compounds such as $SF_6$ and $S_2F_{10}$. The reactive agent of the present invention may also be applied to compounds other than these fluorine compounds. For example, compounds such as $CF_3OCF=CF_2$ which is an unsaturated compound, and $C_5F_8$ (octafluorocyclopentene), or compounds present in the exhaust gas discharged after PFC is used in the etching step, such as HF, $SiF_4$ and $COF_2$, may be similarly decomposed and detoxified.

These fluorine compounds may be diluted with an inert gas such as helium, argon or nitrogen, or with air, or may be a mixed gas containing 0.01 vol % or more of a vapor of the fluorine compound (which is liquid at an ordinary temperature) when accompanied by an inert gas or air. The fluorine compound may be a single compound or a mixture of two or more compounds.

The reactive agent for decomposing fluorine compounds of the present invention is described below.

The reactive agent for decomposing fluorine compounds of the present invention is characterized in that it contains an alumina and an alkaline earth metal compound. The alumina in the reactive agent is a representative acidic substance (solid acid) and known to decompose fluorine compounds by itself. For example, *Shokubai (Catalyst)*, Vol. 34, No. 7, pp. 464–469 (1992) describes the use of alumina as a catalyst for decomposing CFC. Briefly, when CFC is decomposed using alumina ($Al_2O_3$), the alumina surface is fluorinated by fluorine generated at the decomposition. Thus, the alumina is poisoned by $AlF_3$ and thereby loses its catalytic activity within a short time. However, metal halide compounds in general are readily hydrolyzed at a high temperature and by making use of this property, when hydrolysis of $AlF_3$ is performed in the presence of steam together ($2AlF_3 + 3H_2O \rightarrow Al_2O_3 + 6HF$), the alumina regenerated can be catalytically used. This reaction in the presence of water, however, has a problem in that hydrogen fluoride is generated by the decomposition of $AlF_3$ and corrodes the apparatus. To solve this problem, the present inventors have made various studies on the decomposing agent capable of continuously decomposing fluorine compounds, in particular, PFC which is difficult to decompose, at a low temperature in the absence of water. As a result, it has been found that when a reactive agent comprising alumina and an alkaline earth metal compound is used, fluorine compounds can be decomposed at a reaction temperature of 200° C. or more and hydrogen fluoride generated can be fixed as an alkaline earth metal fluoride, thereby attaining detoxification without causing corrosion of the apparatus.

Depending on the kind of the fluorine compound, the reactive agent for decomposing fluorine compounds of the present invention, comprising alumina and an alkaline earth metal compound, may generate carbon monoxide as shown below:

(1) $CF_4 + 2CaCO_3/Al_2O_3 \rightarrow 2CaF_2 + 3CO_2$ (2) $C_2F_6 + 3CaCO_3/Al_2O_3 \rightarrow 3CaF_2 + 4CO_2 + CO$

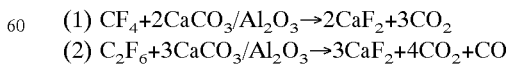

The carbon monoxide can be oxidized under a sufficiently large oxygen partial pressure. However, in the case where the oxygen partial pressure is limited, it has been found, by adding at least one oxide of a metal selected from the group consisting of copper, tin, nickel, cobalt, chromium, molybdenum, tungsten and vanadium, to the reactive agent, the carbon monoxide can be oxidized into carbon dioxide even under a low oxygen partial pressure. This metal oxide is considered to serve also as a co-catalyst of breaking the carbon-carbon bond of the fluorine compound.

The alumina used in the present invention is not particularly limited, however, it is important to select an alumina having a sufficiently large number of active sites which result in the decomposition of fluorine compound and a sufficiently large specific surface area, namely, pores (size and volume of pore) which result in the adsorption of fluorine compound. Accordingly, the alumina preferably has a specific surface area of 50 $m^2/g$ or more, more preferably from 100 to 300 $m^2/g$. Also, it is important to select an appropriate starting material with a reduced level of impurities. Examples of the alumina raw material which can be used in the present invention include an active alumina and a pseudo boehmite alumina. Among these, pseudo boehmite alumina is preferred. The pseudo boehmite alumina may be mixed as it is with an alkaline earth metal compound and used. In the case of baking the pseudo boehmite alumina, the baking may be sufficient if it is performed in an inert gas such as nitrogen or in air at from 400 to 1,000° C., preferably from 500 to 800° C., more preferably from 500 to 600° C., for a few hours.

The content of alkali metals present as impurities in the alumina is suitably 0.1 mass % or less, preferably 0.01 mass % or less, more preferably 0.001 mass % or less. Furthermore, the particle size of the alumina is 100 $\mu$m or less, preferably 30 $\mu$m or less, more preferably 5 $\mu$m or less, and alumina in the powder form is used.

The alkaline earth metal compound as another component of the reactive agent is described below.

The alkaline earth metal compound is preferably a carbonate of magnesium, calcium, strontium or barium, more preferably a carbonate of calcium. In the case where, for example, calcium carbonate is used in the reactive agent, the calcium carbonate present together with alumina fixes fluorine generated by the decomposition of fluorine compound as $CaF_2$ and thereby prevents the fluorination of alumina, so that the alumina maintains the function (activity) of decomposing fluorine compounds.

In the alkaline earth metal compound, similarly to the alumina, the content of alkali metals present as impurities is suitably 0.1 mass % or less, preferably 0.01 mass % or less, more preferably 0.001 mass % or less. The particle size of the alkaline earth metal compound is preferably 100 $\mu$m or less, preferably 30 $\mu$m or less, more preferably 5 $\mu$m or less, and an alkaline earth metal compound in the powder form is used. The alkaline earth metal compound and the alumina used both have a particle size of 100 $\mu$m or less because since respective raw materials are fine powder and easily dispersed with each other, the specific surface area of each raw material increases to allow the alumina and the alkaline earth metal compound to come close without limit and contact each other, whereby the opportunity of fluorine generated by the decomposition of the fluorine compound on the alumina surface reacting with the alkaline earth metal compound increases. Accordingly, the specific surface area of the alkaline earth metal compound is suitably 5 $m^2/g$ or more. Specific examples of the calcium carbonate raw material which can be particularly preferably used include heavy calcium carbonate (obtained by pulverizing limestone), light calcium carbonate (also called precipitated calcium carbonate, obtained by blowing carbon dioxide into milk of lime), and quick lime and slaked lime which are neutralized with carbonic acid. Among these, light calcium carbonate with reduced level of impurities such as alkali metal is preferred, and high-purity calcium carbonate is more preferred.

The mechanism how the reactive agent of the present invention decomposes fluorine compounds at a low temperature is not clearly known. However, since almost no effect is provided by a metal oxide such as iron oxide and manganese oxide, a peculiar composite effect is considered to occur when an alumina and an alkaline earth metal compound, particularly an alumina and a carbonate of an alkaline earth metal, are present together.

The oxide of copper, tin, nickel, cobalt, chromium, molybdenum, tungsten or vanadium, as still another component of the reactive agent of the present invention, is described below.

At least one metal oxide selected from the group consisting of copper oxide, tin oxide, nickel oxide, cobalt oxide, chromium oxide, molybdenum oxide, tungsten oxide and vanadium oxide can be added to the reactive agent. Among these metal oxides, copper oxide, tin oxide and vanadium oxide are preferred, and copper oxide and tin oxide are more preferred. Although the metal oxide is considered to serve also as a co-catalyst for decomposing fluorine compounds, when copper oxide or tin oxide, for example, is used in the reactive agent and allowed to be present together with alumina and an alkaline earth metal compound, depending on the kind of the fluorine compound, the carbon monoxide generated by the decomposition can be oxidized into carbon dioxide under a low oxygen partial pressure.

In the metal oxide, similarly to the above-described raw materials of the reactive agent, the content of alkali metals present as impurities is 0.1 mass % or less, preferably 0.01 mass % or less, more preferably 0.001 mass % or less. The particle size of the metal oxide is suitably 100 $\mu$m or less, preferably 30 $\mu$m or less, more preferably 5 $\mu$m or less, and a metal oxide in a powder form is used.

The manufacturing process of the reactive agent of the present invention is described below.

The process for decomposing fluorine compounds according to the present invention comprises the use of a reactive agent comprising alumina and an alkaline earth metal compound. The content ratio of the alumina and the alkaline earth metal compound present in the reactive agent is suitably, in terms of the mass ratio, from 1:9 to 1:1, preferably from 1:4 to 2:3. The alumina in the reactive agent efficiently decomposes fluorine compounds when it is present together with an alkaline earth metal compound and the content of the alumina may vary as the decomposition reaction proceeds. However, at least in the initial stage of the decomposition reaction, the alumina is preferably present in an amount of 0.1 or more in terms of a mass ratio to the entire reactive agent of which mass is taken as 1. If the mass ratio is less than 0.1, the decomposition of the fluorine compounds may not proceed satisfactorily, whereas if the alumina is present in an amount in excess of 0.5 in terms of the mass ratio, the amount of the alkaline earth metal compound decreases in proportion and the effective utilization factor of the reactive agent decreases.

The content ratio of the metal oxide is preferably, in terms of the ratio to the total mass of the alumina and the alkaline earth metal compound, from 1:99 to 5:95. If this mass ratio is excessively small, the effect cannot be obtained, whereas if it is excessively large, the total amount of the alumina and the alkaline earth metal compound relatively decreases and the effect of the metal oxide is saturated, therefore, the decomposition of fluorine compounds cannot proceed efficiently.

The reactive agent for decomposing fluorine compounds of the present invention can be prepared by mixing the alumina and the alkaline earth metal compound at the above-described mass ratio and if desired, by adding a metal oxide, and may be used as it is. Here, the water content in respective raw materials is preferably reduced as low as possible. The water content in the reactive agent is preferably 1 mass % or less.

The reactive agent can also be prepared by granulating those raw materials and may be used as a granule. In forming the reactive agent by granulation, water or depending on the particle size of the raw materials, water and a binder may be added. The binder is not particularly limited as long as it does not affect the raw materials blended, and may be added in an amount of from 0.03 to 0.05 in terms of the mass ratio to the total mass of the raw materials blended which is taken as 1.0. The binder is preferably fine powder alumina. By adding fine powder alumina, respective raw materials are more improved in the dispersibility, and difficulty in the granulation of an alkaline earth metal compound can be overcome. In the alumina added as the binder, the particle size is suitably 0.1 $\mu$m or less, and the content of alkali metals contained as impurities is suitably 0.1 mass % or less, preferably 0.01 mass % or less. This fine powder alumina is advantageous in that the effect can be obtained even with a small amount and the relative contents of effective components per unit volume of the reactive agent scarcely decrease. However, as long as the binder does not affect the capability of the reactive agent obtained, the kind and the amount of the binder are not limited.

As described above, each of the raw materials blended in the reactive agent, including the fine powder alumina added as the binder, preferably has an alkali metal content of 0.1 mass % or less. If the alkali metal content in the reactive agent exceeds 0.1 mass %, the active sites on the alumina surface decrease and thereby the decomposition ratio particularly of PFC such as $CF_4$ and $C_2F_6$ is reduced.

In manufacturing the granular reactive agent for use in the present invention, respective raw materials are blended and then kneaded while adding an appropriate amount of water, and the kneaded product is granulated to provide a granular article. As the kneader necessary for the preparation of this granular article, those capable of performing mixing and granulation at the same time are convenient, however, those where the mixing and the granulation are separately performed may also be used. For example, when a Henschel mixer or a vertical mixer is used, the mixing and the granulation can be performed at the same time. However, it is also possible to mix the raw materials in a Henschel mixer or a V-type mixer and granulate the mixture in a pan-type pelletizer or a drum pelletizer.

The granular article is then dried at from 100 to 200° C. in an inert gas such as nitrogen or in air so as to evaporate water. The reasons why the reactive agent is used as a granular article are to have high decomposing activity of the reactive agent and to increase hardness and thereby to prevent crushing or flouring during filling into a reactor or handling. For this purpose, it is preferable to further bake the granular article. More specifically, the granulated and dried article is baked at from 400 to 700° C., preferably from 500 to 700° C. in an inert gas such as nitrogen or in air. The reasons for baking at 400° C. or more is that the water added during the granulation can be further evaporated to increase the decomposing activity and that the hardness can be further increased. If the baking temperature exceeds 700° C., the decomposing ratio (activity) of the reactive agent decreases though it is not clearly known whether this is ascribable to the decomposition of the alkaline earth metal compound (for example, $CaCO_3 \rightarrow CaO+CO_2$). In other words, it is important to almost completely dehydrate the bound water of alumina at 700° C. or less where the activity of reactive agent does not decrease. The water content in the baked reactive agent is preferably such that the amount of water content released on heating at 550° C. in an inert gas or air is 1 mass % or less. The baking may be performed in continuous equipment such as rotary kiln but may also be performed in a stationary furnace.

As described above, the reactive agent for decomposing fluorine compounds of the present invention comprises alumina and an alkaline earth metal compound as essential components. In the case where carbon monoxide is generated, the reactive agent can also contain at least one oxide of a metal selected from the group consisting of copper, tin, nickel, cobalt, chromium, molybdenum, tungsten and vanadium, so as to oxidize the carbon monoxide into carbon dioxide even under a low oxygen partial pressure. The reactive agent is preferably in the granular form for increasing opportunities of contact with a fluorine compound to be decomposed. If the particle size is excessively large, the surface area participating in the adsorption and diffusion of the fluorine compound gas is relatively reduced and the diffusion rate becomes lower. On the other hand, if the particle size is excessively small, the surface area participating in the adsorption and diffusion of the fluorine compound gas is relatively increased and the diffusion rate becomes higher. However, the amount of gas to be treated increases to give a large differential pressure and this prevents the reduction in the size of reactor or the like. Accordingly, the particle size of the reactive agent is suitably from 0.5 to 10 mm, preferably from 1 to 5 mm.

The process for decomposing fluorine compounds according to the present invention is described below.

When the reactive agent produced by the method described above is contacted with a fluorine compound at an appropriate temperature, the fluorine compound is decomposed and the chlorine atom and/or fluorine atom generated by the decomposition is fixed to the reactive agent as a chloride and/or a fluoride of an alkaline earth metal. In the case where the gas to be treated contains a sulfur fluoride such as $SF_6$, the sulfur atom generated by the decomposition is fixed to the reactive agent as a sulfate of an alkaline earth metal, thus, the generation of sulfur oxides can be controlled.

In other words, when the reactive agent for decomposition of the present invention is used, fluorine compounds can be efficiently decomposed without releasing harmful decomposition product gases, for example, compounds such as HF, $SiF_4$, $COF_2$ and $SO_x$. However, in order to prevent such decomposition products from remaining in the decomposed gas, the reaction conditions must also be appropriately controlled, such as the reaction temperature, the concentrations of fluorine compounds in the gas to be treated, the presence or absence of oxygen in the gas to be treated, the form of the reactive agent, and the rate of supplying the gas to be treated. Among these, the reaction (decomposition initiating) temperature is a very important condition.

The reaction temperature varies depending on the kind of the fluorine compound present in the gas to be treated.

For example, PFC is classified into compounds which are difficult to decompose out of fluorine compounds. In particular, $CF_4$, $C_2F_6$ and the like are most difficult to decompose, and for decomposing these only by mere thermal decomposition, a high temperature of from 1,200 to 1,400° C. is necessary. However, according to the process of the present invention, these can be decomposed at 550° C. or more. Furthermore, $CHClF_2$ which is an HCFC can be decomposed at a temperature of 200° C. or more by the process of the present invention. As such, the decomposition temperature varies by a fairly large range depending on the kind of fluorine compound. Therefore, it is important to set the reactor at an optimal temperature according to the kind of compound to be decomposed.

Since the reaction temperature thus varies depending on the kind or structure of compound, when the gas to be treated contains multiple kinds of PFC or HFC as in the gas discharged from the etching or cleaning step in the process of manufacturing semiconductor devices, the reaction temperature is set at 550° C. or more to detoxify all of these fluorine compounds. In the case where, for example, a carbonate is used as the alkaline earth metal compound, carbons originated from the fluorine compound are oxidized by oxygen released upon decomposition of the carbonate and mostly released as $CO_2$. Depending on the kind of fluorine compound, CO may be generated. However, by allowing oxygen to be present in the gas to be treated, CO is easily oxidized into $CO_2$ with the same reactive agent and can be completely detoxified.

In other words, the process for decomposing fluorine compounds according to the present invention can be performed by passing a gas containing fluorine compounds through a reactor filled with the reactive agent, while maintaining the decomposition temperature according to the decomposability of the fluorine compound. Even if the reaction atmosphere is a non-oxidative atmosphere, the object may be fully attained. However, for reducing CO to an acceptable concentration or less, the treatment is performed in an oxidative atmosphere, for example, in an atmosphere where 20 vol % or less of oxygen gas is present in the gas to be treated. In this atmosphere, CO can also be simultaneously treated. The oxygen gas concentration is 20 vol % or less because air is preferably used as the diluting gas. Even if the oxygen gas concentration is higher than this range, the effect is saturated and the decomposing activity does not increase any more.

The fluorine compound concentration in the gas to be treated is not particularly limited, however, an excessively low concentration is disadvantageous in view of profitability. On the other hand, if the concentration is excessively high, the reaction temperature increases due to the heat generated by the decomposition though this may vary depending on the kind of fluorine compound, and sometimes the temperature within the reactor can be hardly controlled. Therefore, the gas to be treated is preferably diluted with an inert gas or an oxygen gas-containing gas (including air) such that the fluorine compound concentration becomes from 0.01 to 10 vol %, preferably from 0.01 to 5 vol %, more preferably from 0.01 to 3 vol %. The fluorine compound concentration in the gas is not particularly limited to this concentration when the heat generated by the decomposition can be removed affirmatively and the reaction temperature can be controlled.

In this way, preferred reaction conditions are established according to respective cases by taking account of the kind and concentration of the fluorine compound in the gas subjected to the decomposition treatment, the oxygen gas concentration in the gas to be treated, SV (space velocity), LV (linear velocity) and the mixed state with other gases.

The decomposition treatment may be performed using a decomposition apparatus comprising a reactor filled with the above-described reactive agent, an inlet for the gas to be treated, which is provided to communicate with the inside of the reactor, a gas outlet for discharging the gas out of the reactor after the reaction, a furnace for housing the reactor and a heat source for elevating the furnace atmosphere to a predetermined temperature, by connecting the inlet for gas to be treated and a fluorine compound gas source through a pipeline.

FIG. 1 is a view showing one example of the apparatus for practicing the present invention. While previously allowing a constant amount of a carrier gas to flow through a nitrogen gas supply line 2 or an air or oxygen gas supply line 3, a preheating zone 9 for heating the gas to be treated in a reactor 8 and a reactive agent 12 filled downstream are heated to a predetermined temperature by an electric heater 11 using a temperature sensor 7 provided in the reactor 8 and a temperature controlling unit 10, and then controlled at a constant temperature.

After the control to a predetermined temperature, gases to be treated are introduced into a mixing chamber and a header 4 through respective valves from a fluorine compound gas supply line 1 and a nitrogen gas supply line 2 or an air or oxygen supply line 3. The mixed gas to be treated is introduced into the reactor 8 through a gas inlet tube 6. The gas to be treated, which is introduced into the reactor 8 and heated in the preheating zone 9, is contacted with the reactive agent heated to a predetermined temperature and thereby decomposed. After the decomposition, the treated gas (exhaust gas) is cooled to a predetermined temperature by a cooler 14 (either water cooling or air cooling is possible) and discharged from a discharge tube 16. For sampling a gas, sampling ports for the gas to be treated 5 and for the treated gas 15 may be provided in the vicinity of inlet and outlet ports of the reactor 8 and thereby the components of each gas may be analyzed.

As such, the fluorine compounds in the gas to be treated can be almost completely (in a decomposition ratio of nearly 100%) decomposed. The fluorine component in the decomposed fluorine compound is fixed to the reactive agent as a stable alkaline earth metal fluoride such as $CaF_2$ and the carbon component is mostly discharged as $CO_2$ together with the diluting gas such as nitrogen gas. Accordingly, the treated gas is a harmless gas substantially free of residual harmful materials such as fluorine component or carbon monoxide.

The decomposition reaction terminates when the reactive agent present is used up. This end of the decomposition reaction is known by the time when the fluorine compound is first detected. The fluorine compound may be decomposed in a batch system where when the fluorine compound is detected and the reactive agent loses the decomposing activity, the apparatus stops the operation and after newly filling the reactive agent, the decomposition reaction re-starts, or by sequentially exchanging the reactor with spare reactors previously filled with the reactive agent in the same apparatus.

In order to continuously use the batch system, a multiple tower switch system may also be adopted, where a plurality of reactors of the same type are juxtaposed, the reactive agent of one reactor is exchanged while another reactor is operating, or the reactor is exchanged with a separate reactor previously filled with a reactive agent, and when one reactor is stopped, the gas passage is switched to another reactor. Furthermore, when the apparatus used is designed to have a function of continuously or intermittently supplying the reactive agent into the reactor and continuously or intermittently discharging the used reactive agent from the reactor, the operation can be continuously performed for a long period of time in the same apparatus.

As described above, according to the present invention, the fluorine compound can be decomposed with good efficiency and the gas discharged is substantially free of residual harmful materials such as fluorine component or carbon monoxide. The fluorine compound described here is a compound which can be used as an etching gas in the etching step or as a cleaning gas in the cleaning step during the process of manufacturing semiconductor devices, and this is at least one fluorine compound selected from the group consisting of perfluorocarbon, hydrofluorocarbon, chlorofluoro carbon, hydrochlorofluorocarbon, perfluoroether, hydrofluoroether, fluoroolefin and sulfur fluoride. The present invention is a process for manufacturing a semiconductor device, comprising an etching or cleaning step of using the above-described fluorine compound as an etching or cleaning gas and a decomposition step of decomposing a fluorine compound-containing gas discharged from the etching or cleaning step using the reactive agent comprising alumina and an alkaline earth metal compound, where the fluorine compound-containing gas can be decomposed and detoxified with good efficiency.

In the process for manufacturing a semiconductor device such as LSI and TFT, a thin or thick film is formed using a CVD method, a sputtering method or a vacuum evaporation method, and then a circuit pattern is formed by etching. In the apparatus for forming the thin or thick film, cleaning is performed so as to remove unnecessary deposits accumulated on inner walls of the apparatus or jigs. The accumulated unnecessary deposits cause generation of particles, therefore, must be removed on occasion for producing a good film.

The etching method using, for example, the above-described fluorine compound can be performed under various dry etching conditions such as plasma etching and microwave etching. The gas discharged from the etching step may contain, for example, compounds such as $SiF_4$ and $COF_2$ or gases such as hydrogen chloride and hydrogen fluoride, in addition to those fluorine compounds. However, as described above, by using the reactive agent of the present invention, these compounds and gases can be simultaneously decomposed and the chlorine or fluorine atom can be fixed as a chloride or a fluoride of an alkaline earth metal or the carbon atom can be decomposed into carbon dioxide and thus detoxified.

Depending on the kind of the fluorine compound, CO may be generated. However, by allowing an oxygen gas to be present during the decomposition step with the gas to be treated, CO can be easily oxidized into $CO_2$ and thus can be completely detoxified.

Furthermore, the process of the present invention can be used in the process for manufacturing semiconductor devices described in JP-A-10-12605 and JP-A-2000-58840.

The present invention is described in greater detail below by referring to Examples, however, the present invention should not be construed as being limited thereto. Unless otherwise indicated herein, all percents, parts ratios and the like are by weight.

PREPARATION EXAMPLE OF REACTIVE AGENTS

Various raw materials of reactive agents used in tests are shown in Table 1.

TABLE 1

| Name of Raw Materials of Reactive Agent | Particle Size ($\mu$m) | Specific Surface Area ($m^2$/g) | Impurities (mass %) | | | |
|---|---|---|---|---|---|---|
| | | | Na | K | Fe | Si |
| $CaCO_3$-a (high-purity calcium carbonate) | 40 | — | 0.0012 | 0.0005 | <0.0001 | <0.0001 |
| $CaCO_3$-b (light calcium carbonate) | 50 | — | 0.0056 | 0.0008 | 0.0010 | 0.001 |
| $CaCO_3$-c (heavy calcium carbonate) | 45 | — | 0.0104 | 0.0027 | 0.0050 | 0.09 |
| $SrCO_3$ (strontium carbonate) | — | — | 0.0107 | 0.001 | 0.005 | — |
| $Al_2O_3$-a [AlO(OH)] (pseudo boehmite alumina) | 60 | 241 | 0.0027 | <0.001 | $Fe_2O_3$ 0.0034 | $SiO_2$ 0.0066 |
| $Al_2O_3$-b [$Al_2O_3$] ($Al_2O_3$-a baked at 550° C. for 3 hours) | — | 173 | — | — | — | — |
| $Al_2O_3$-c (active alumina) | 10 | 255 | 0.067 | <0.001 | $Fe_2O_3$ 0.03 | $SiO_2$ 0.01 |
| $Al_2O_3$-d (active alumina) | 5 | 201 | 0.28 | <0.001 | $Fe_2O_3$ 0.01 | $SiO_2$ 0.01 |
| CuO (cupric oxide) | 4–10 | — | <0.01 | <0.01 | <0.01 | <0.05 |
| $SnO_2$ (stannic oxide) | 4–10 | — | <0.01 | <0.01 | <0.01 | <0.05 |
| $V_2O_5$ (vanadium pentoxide) | 4–10 | — | <0.01 | <0.01 | <0.01 | <0.05 |
| $Cr_2O_3$ (chromium oxide) | 10 | — | <0.01 | <0.01 | <0.01 | — |
| Binder I (ultrafine powder alumina) | <0.1 | — | <0.001 | <0.001 | <0.001 | <0.001 |
| Binder II (clay) | 50 | — | $Na_2O$ 0.06 | $K_2O$ 0.07 | $Fe_2O_3$ 2.13 | $SiO_2$ 57.73 |

In Table 1, with respect to the same raw materials of the reactive agent, an alphabetic designation (for example, $CaCO_3$-a) or an Arabic figure designation is affixed to the chemical formula so as to differentiate the materials by grades. This differentiation also applies to the materials in Tables 2 to 6 showing Examples and Comparative Examples.

Using the materials shown in Table 1 as the raw materials, granular articles having a particle size of from 0.85 to 2.8 mm were produced. More specifically, the materials shown, for example, in Test Condition 1 of Table 2 and a binder were blended, mixed in a Henschel mixer and, after adding water thereto, granulated. The resulting granulate was dried at 110° C. for 3 hours and then sieved. Each of the granular articles produced was dehydration baked by a heat treatment at a baking temperature of 550° C. or 700° C. (electric furnace) shown in Test Condition 2 of Table 2 for 3 hours in an air atmosphere to prepare a reactive agent.

REACTION EXAMPLE

The process of the present invention was performed using an apparatus having the same arrangement as the apparatus shown in FIG. 1. Namely, along the center of axis of a cyclic furnace (electric capacity: 1.4 KW, length: 400 mm) with heating elements (kanthal alloy) capable of generating heat on passing of electricity, a reaction tube comprising Inconel 600 (or SUS310S) and having an internal diameter of 16 mm and a length of 500 mm was pierced and 35 ml of a reactive agent for decomposing fluorine compounds was filled in the furnace center of the reaction tube.

Fluorine compounds to be decomposed were used and as shown in FIG. 1, after adding or not adding oxygen gas thereto, the fluorine compounds were introduced into the above-described reaction tube using nitrogen gas as a carrier. At this time, the conditions were as follows.

| | |
|---|---|
| Flow rate of gas to be treated | 0.20 l/min |
| Concentration of fluorine compound in gas to be treated: | 0.5 to 3 vol % |
| Space velocity of gas to be treated: | 343 hr$^{-1}$ |
| Linear velocity of gas to be treated: | 1.0 m/min |
| Concentration of oxygen gas in the gas to be treated: | 20 vol % or less |

In some tests, HF, $SiF_4$ or CO gas was allowed to be present together in the gas to be treated, or reaction tubes were connected.

In each Example, the gas to be treated was introduced after starting charging of the heating element while controlling the quantity of electricity in the cyclic furnace so that the temperature measured by a thermocouple inserted into the center part of the reactive agent (the site reaching a highest temperature in the bulk of the reactive agent) could be maintained at a predetermined temperature. In the respective Tables, the reaction temperature indicates this temperature maintained during the reaction.

The gas to be treated and the treated gas were sampled from respective sampling ports shown in FIG. 1 and the composition analyzed. $O_2$, $N_2$, CO, $CO_2$ and fluorine compounds were analyzed using a gas analyzer, and F ion was sampled in a fluorine absorbing bottle containing a sodium hydroxide solution and analyzed.

The reactive agent compositions (combinations of materials) and the binders shown in Test Condition 1 of Tables 2 to 6 correspond to respective raw material names of the reactive agent shown in Table 1. For example, high-purity calcium carbonate is shown as $CaCO_3$-a, pseudo boehmite alumina as $Al_2O_3$-a and ultrafine powder alumina binder as Binder I. The reactive agents were prepared by adding Binder I in a mass ratio of 0.05 or Binder II in a mass ratio of 0.1, assuming that the mass after the alumina and the alkaline earth metal compound were blended is 1.0. The decomposition test was performed using the reactive agents shown in Test Condition 1 of Tables 2 to 6 based on Test Condition 2. The results are shown by the decomposition ratio of fluorine compounds every hour after the gas to be treated was introduced and by the concentration (vol %) of CO or F ion present in the gas treated.

Decomposition ratio=(concentration of fluorine compound in gas to be treated−concentration of fluorine compound in treated gas)÷(concentration of fluorine compound in gas to be treated)×100(%)

EXAMPLES 1 TO 3

Using the reactive agents which varied in the ratio of alumina and calcium carbonate blended in the reactive agent as shown in Table 2, decomposition reactions of $CF_4$ were performed. The alumina used was pseudo boehmite alumina (hereinafter simply referred to as "$Al_2O_3$-a") and the alkaline earth metal compound used was high-purity calcium carbonate (hereinafter simply referred to as "$CaCO_3$-a"). The reaction temperature was constantly 650° C. and the oxygen concentration was set to 3.5 vol %.

The results obtained are shown in Table 2. With any blending ratio, a decomposition ratio of 99% or more was attained within 3 hours after the gas to be treated was introduced. Furthermore, as shown in Table 2, almost no F ion or CO was detected in the treated gas of Example 1.

EXAMPLES 4 TO 6

A reactive agent prepared under the same conditions as in Example 2 was used for decomposition reactions of $CF_4$ by varying the reaction temperature. The results are shown in Table 2. At a reaction temperature of 600° C., a decomposition ratio of 99% or more was attained and at 700° C., a decomposition ratio of 99.9% or more was attained within 5 hours after the gas to be treated was introduced.

EXAMPLE 7

A decomposition reaction of $CF_4$ was performed under the same conditions as in Example 6 except that the temperature at the baking of reactive agent was changed from 550° C. to 700° C. The results obtained are shown in Table 2. The $CF_4$ decomposing ratio was the same and 99% or more, however, the decomposition ratio was gradually decreased as compared with Example 6.

EXAMPLES 8 AND 9

Decomposition reactions of $CF_4$ were performed under the same conditions as in Example 2 and Example 7 except that the alumina in the reactive agent was changed to pseudo boehmite alumina baked at 550° C. for 3 hours (hereinafter simply referred to as $Al_2O_3$-b). In Example 8, a decomposition reaction using a reactive agent having added thereto Binder II was also conducted. The results are shown in Table 2. The decomposition ratio of Example 8 was almost the same as in Example 2, revealing no difference due to variation of the binder. In Example 9, the test was performed by setting both the baking temperature and the reaction temperature at 700° C. in the same manner as in Example 7, then, a high decomposition ratio could be maintained.

TABLE 2

| | Test Condition 1 | | | Test Condition 2 | | | | Test Results | | | | |
|---|---|---|---|---|---|---|---|---|---|---|---|---|
| | Reactive Agent (combination and blending ratio of materials) | | | Baking Temperature (° C.) Amount of Reactive Agent (ml) | Reaction Temperature (° C.) Oxygen Concentration (vol %) | Kind and Concentration of Fluorine Compound (vol %) | | Decomposition Ratio of Fluorine Compound Gas in Treated Gas after Aging (%), Fluorine Ion Concentration in ( ) and CO Concentration in [ ], (vol %) | | | | |
| Example | Composition (combination of materials) | Blending Ratio (mass ratio of materials) | Binder | | | | | 1 Hr | 2 Hr | 3 Hr | 4 Hr | 5 Hr |
| 1 | Al₂O₃-a/CaCO₃-a | 0.19/0.81 | I | 550 | 650 | CF₄ | 3.0 | >99.9 | >99.9 | 99.9 | 99.1 | 95.9 |
| | | | | 35 | 3.5 | | | [<0.001] | [<0.001] | [<0.001] | [<0.001] | (<0.0001) |
| 2 | Al₂O₃-a/CaCO₃-a | 0.30/0.70 | I | | | | | >99.9 | >99.9 | >99.9 | 99.7 | 97.6 |
| 3 | Al₂O₃-a/CaCO₃-a | 0.45/0.55 | I | | | | | >99.9 | >99.9 | >99.9 | 98.8 | 60.4 |
| 4 | Al₂O₃-a/CaCO₃-a | 0.30/0.70 | | 550 | 550 | CF₄ | 3.0 | 82.2 | 82.0 | 81.3 | 78.0 | 68.0 |
| | | | | 35 | 3.5 | | | | | | | |
| 5 | Al₂O₃-a/CaCO₃-a | 0.30/0.70 | | 550 | 600 | | | 99.8 | 99.7 | 98.8 | 94.7 | 89.1 |
| | | | | 35 | 3.5 | | | | | | | |
| 6 | Al₂O₃-a/CaCO₃-a | 0.30/0.70 | | 550 | 700 | | | >99.9 | >99.9 | >99.9 | >99.9 | 99.9 |
| | | | | 35 | 3.5 | | | | | | | |
| 7 | Al₂O₃-a/CaCO₃-a | 0.30/0.70 | | 700 | 700 | CF₄ | 3.0 | >99.9 | >99.9 | 99.8 | 99.0 | 94.0 |
| | | | | 35 | 3.5 | | | | | | | |
| 8 | Al₂O₃-b/CaCO₃-a | 0.30/0.70 | I | 550 | 650 | CF₄ | 3.0 | >99.9 | >99.9 | >99.9 | 99.4 | 94.9 |
| | | | II | 35 | 3.5 | | | >99.9 | >99.9 | >99.9 | 99.5 | 94.6 |
| 9 | Al₂O₃-b/CaCO₃-a | 0.30/0.70 | I | 700 | 700 | | | >99.9 | >99.9 | >99.9 | >99.9 | 99.6 |
| | | | | 35 | 3.5 | | | | | | | |

EXAMPLES 10 TO 13

Decomposition reactions of $CF_4$ were performed under the same conditions as in Example 2 and Example 6 except that the calcium carbonate in the reactive agent was changed to light calcium carbonate (hereinafter simply referred to as "$CaCO_3$-b") or heavy calcium carbonate (hereinafter simply referred to as "$CaCO_3$-c"). The results obtained are shown in Table 3. It can be seen that the decomposition ratio of $CF_4$ corresponds to the total amount of impurities in each calcium carbonate shown in Table 1 and has a tendency to decrease in the order of $CaCO_3$-a (Examples 2 and 6)>$CaCO_3$-b (Examples 10 and 11)>$CaCO_3$-c (Examples 12 and 13).

EXAMPLES 14 TO 16

Decomposition reactions of $CF_4$ were performed under the same conditions as in Example 13 except that the alumina in the reactive agent was changed to the alumina ($Al_2O_3$-b, $Al_2O_3$-c or $Al_2O_3$-d) shown in Table 1. The results obtained are shown in Table 3. It is seen that the decomposition ratio of $CF_4$ corresponds to the amount of impurities in each $Al_2O_3$ and decreases in the order of $Al_2O_3$-a (Example 13)≧$Al_2O_3$-b (Example 14)>$Al_2O_3$-c (Example 15)>$Al_2O_3$-d (Example 16).

EXAMPLE 17

A decomposition reaction was performed under the same conditions as in Example 1 except that the fluorine compound was changed from $CF_4$ to $C_2F_6$. The results obtained are shown in Table 3. The decomposition ratio of $C_2F_6$ reached 80% or more within 3 hours after the gas to be treated was introduced.

EXAMPLES 18 TO 20

Decomposition reactions of $C_2F_6$ were performed under the same conditions as in Example 2 except that the reaction temperature and the oxygen concentration were changed. The results obtained are shown in Table 3. In Example 18, the reaction temperature and the oxygen concentration were set to 600° C. and 3.5 vol %, respectively, however, the decomposition ratio of $C_2F_6$ was on the same level as in Example 17 and the effect of controlling the generation of CO was not sufficiently high.

In Examples 19 and 20, the decomposition reaction was performed by changing the reaction temperature to 650° C. and the oxygen gas concentration to 0 vol % or 20 vol %. In either example, the decomposition ratio of $C_2F_6$ reached 90% or more within 3 hours after the gas to be treated was introduced. In Example 19, nearly 3% of CO was generated, whereas in Example 20, CO was not detected until 3 hours after the gas to be treated was introduced. From this, it is seen that generation of CO can be almost completely controlled by allowing oxygen gas to be present.

TABLE 3

| | Test Condition 1 | | | Test Condition 2 | | | Test Results | | | | |
|---|---|---|---|---|---|---|---|---|---|---|---|
| | Reactive Agent (combination and blending ratio of materials) | | | Baking Temperature (°C.) Amount of Reactive Agent | Reaction Temperature (°C.) Oxygen Concentration | Kind and Concentration of Fluorine Compound | Decomposition Ratio of Fluorine Compound Gas in Treated Gas after Aging (%), Fluorine Ion Concentration in ( ) and CO Concentration in [ ], (vol %) | | | | |
| Example | Composition (combination of materials) | Blending Ratio (mass ratio of materials) | Binder | (ml) | (vol %) | (vol %) | 1 Hr | 2 Hr | 3 Hr | 4 Hr | 5 Hr |
| 10 | Al₂O₃-a/CaCO₃-b | 0.30/0.70 | I | 550 35 | 650 3.5 | CF₄ 3.0 | >99.9 | >99.9 | 99.5 | 99.0 | 98.5 |
| 11 | Al₂O₃-a/CaCO₃-b | 0.30/0.70 | I | | 700 3.5 | | >99.9 | >99.9 | >99.9 | 99.6 | 94.9 |
| 12 | Al₂O₃-a/CaCO₃-c | 0.30/0.70 | I | 550 35 | 650 3.5 | CF₄ 3.0 | >99.9 | 99.9 | 98.8 | 94.7 | — |
| 13 | Al₂O₃-a/CaCO₃-c | 0.30/0.70 | I | | 700 3.5 | | >99.9 | >99.9 | >99.9 | 99.9 | — |
| 14 | Al₂O₃-b/CaCO₃-c | 0.30/0.70 | I | 550 35 | 700 3.5 | CF₄ 3.0 | >99.9 | >99.9 | 99.9 | 99.4 | — |
| 15 | Al₂O₃-c/CaCO₃-c | 0.30/0.70 | | | | | >99.9 | 99.7 | 97.8 | 89.4 | — |
| 16 | Al₂O₃-d/CaCO₃-c | 0.30/0.70 | | | | | 32.9 | 27.4 | — | — | — |
| 17 | Al₂O₃-a/CaCO₃-a | 0.19/0.81 | I | 550 35 | 650 3.5 | C₂F₆ 3.0 | 85.8 [0.021] | 84.9 [0.020] | 82.8 [0.020] | 75.2 [0.088] | 62.5 [0.182] |
| 18 | Al₂O₃-a/CaCO₃-a | 0.30/0.70 | | | 600 3.5 | | 86.5 [0.14] | 84.9 [0.13] | 81.2 [0.52] | 70.2 [0.60] | 49.7 [0.47] |
| 19 | Al₂O₃-a/CaCO₃-a | 0.30/0.70 | I | 550 35 | 650 0 | C₂F₆ 3.0 | 98.3 [2.77] | 97.4 [2.74] | 89.2 [3.16] | 73.3 [2.04] | 45.7 [1.32] |
| 20 | Al₂O₃-a/CaCO₃-a | 0.30/0.70 | I | | 650 20.0 | | 99.2 [<0.001] | 97.4 [<0.001] | 91.3 [<0.001] | 72.2 [0.006] | 35.5 [0.080] |

EXAMPLES 21 TO 24

Decomposition reactions of $C_2F_6$ were performed under the same conditions as in Example 20 except that the reactive agent used was obtained by adding a metal oxide (Example 21: $V_2O_5$, Example 22: $SnO_2$, Example 23: $CuOO+SnO_2$, Example 24: $Cr_2O_3$) to a reactive agent having a mass ratio of $Al_2O_3$-a/$CaCO_3$-a=0.3/0.7 and the oxygen concentration was changed from 20 vol % to 3.5 vol %. The results obtained are shown in Table 4. The decomposition ratio of $C_2F_6$ was almost the same as the results in Examples 18 to 20, but CO was scarcely detected even with an oxygen gas concentration of 3.5 vol % was present. From this, it is seen that by adding a metal oxide to the reactive agent, CO can be almost completely oxidized even under a low oxygen partial pressure.

EXAMPLES 25 AND 26

Decomposition reactions of a mixed gas of $CF_4$ and $C_2F_6$ were performed under the same conditions as in Example 2 except that two units of reaction tubes were connected (reactive agent 35×2=70 ml) and the reaction temperature was changed to 550° C. or 650° C. The results obtained are shown in Table 4. In Example 25 where the reaction temperature was 550° C., the decomposition ratio of $C_2F_6$ was as low as about 70% but the decomposition ratios of both $C_2F_6$ and $CF_4$ were almost constantly maintained. In Example 26 where the reaction temperature was 650° C., a high decomposition ratio could be maintained for both $CF_4$ and $C_2F_6$.

EXAMPLES 27 AND 28

Decomposition reactions of $CF_4$ were performed under the same conditions as in Example 2 except that CO was present together or HF and $SiF_4$ were present together. The results obtained are shown in Table 4. In Example 27 where CO was present together, CO was not detected in the treated gas, and in Example 28 where HF and $SiF_4$ were present together, F ion was not detected in the treated gas.

EXAMPLES 29 TO 39

Decomposition reactions were performed under the same conditions as in Example 2 by varying the kind and the concentration of the fluorine compound and the reaction temperature. The results are shown in Table 5. Despite different reaction temperatures, a high decomposition ratio was attained for any fluorine compound. The structures of fluorine compounds used in Examples 31 to 39 are shown below.

Example 31

Example 32

Example 33

Example 34

Example 35

Example 36

Example 37

Example 38

Example 39

EXAMPLE 40

A decomposition reaction of $CF_4$ was performed under the same conditions as in Example 2 except that $CaCO_3$ in the reactive agent was changed to $SrCO_3$. The results obtained are shown in Table 5. Although the decomposition ratio slightly decreases in the case of $SrCO_3$, the reactive agent can be used as a reactive agent for decomposing fluorine compounds.

COMPARATIVE EXAMPLES 1 AND 2

The tests were performed in the same manner as in the Examples with respect to the preparation of the reactive agent, the reaction example and the like.

Decomposition reactions of $CF_4$ were performed under the test conditions shown in Table 6 using a reactive agent comprising only alumina. As a result, the reaction ratio was abruptly reduced 2 hours after the gas to be treated was introduced.

COMPARATIVE EXAMPLES 3 AND 4

Reactive agents were prepared under the same conditions as in Example 2 except that $MnO_2$ or $Fe_2O_3$ was used in place of $CaCO_3$ in the reactive agent and the decomposition reaction of $CF_4$ was performed at 700° C. The results obtained are shown in Table 6. In either example, the decomposition ratio was low from the beginning.

TABLE 4

| | Test Condition 1 — Reactive Agent (combination and blending ratio of materials) | | | Test Condition 2 — Baking | | Reaction Temperature (° C.) Oxygen Concentration (vol %) | Kind and Concentration of Fluorine Compound (vol %) | | Test Results — Decomposition Ratio of Fluorine Compound Gas in Treated Gas after Aging (%), Fluorine Ion Concentration in ( ) and CO Concentration in [ ], (vol %) | | | | |
|---|---|---|---|---|---|---|---|---|---|---|---|---|---|
| Example | Composition (combination of materials) | Blending Ratio (mass ratio of materials) | Binder | Temperature (° C.) | Amount of Reactive Agent (ml) | | | | 1 Hr | 2 Hr | 3 Hr | 4 Hr | 5 Hr |
| 21 | $V_2O_5$ added to Example 20 | 0.97/0.03 | I | 550 | 35 | 650 3.5 | $C_2F_6$ | 3.0 | 99.0 [<0.001] | 97.4 [<0.001] | 90.3 [0.001] | 72.3 [0.006] | 35.0 [0.010] |
| 22 | $SnO_2$ added to Example 20 | 0.97/0.03 | | | | | | | 99.0 [<0.001] | 96.7 [<0.001] | 91.5 [<0.001] | 72.0 [0.024] | 40.3 [0.023] |
| 23 | $CuO + SnO_2$ added to Example 20 | 0.98/ 0.005 + 0.015 | I | | | | | | 98.9 [<0.001] | 97.3 [<0.001] | 91.2 [<0.001] | 73.2 [<0.001] | 36.3 [<0.001] |
| 24 | $Cr_2O_3$ added to Example 20 | 0.97/0.03 | I | | | | | | 98.7 [<0.001] | 97.0 [0.003] | 90.1 [0.027] | 72.7 [0.047] | 38.6 [0.030] |
| 25 | $Al_2O_3$-a/$CaCO_3$-a | 0.30/0.70 | I | 550 | 35 × 2 | 550 3.5 | $CF_4$ $C_2F_6$ | 1.5 1.5 | 99.7 68.9 | 99.7 68.9 | 99.7 68.9 | 99.5 62.9 | 99.4 62.8 |
| 26 | $Al_2O_3$-a/$CaCO_3$-a | 0.30/0.70 | I | | | 650 3.5 | $CF_4$ $C_2F_6$ | 1.5 1.5 | >99.9 >99.9 | >99.9 >99.9 | >99.9 >99.9 | >99.9 99.8 | >99.9 99.8 |
| 27 | $Al_2O_3$-a/$CaCO_3$-a | 0.30/0.70 | I | 550 | 35 | 650 3.5 | $CF_4$ CO | 3.0 0.5 | >99.9 [<0.001] | >99.9 [<0.001] | >99.9 [<0.001] | 99.8 [<0.001] | 90.2 [<0.001] |
| 28 | $Al_2O_3$-a/$CaCO_3$-a | 0.30/0.70 | I | | | | $CF_4$ HF $SiF_4$ | 0.5 0.5 0.5 | >99.9 (<0.0001) | >99.9 (<0.0001) | >99.9 (<0.0001) | >99.9 (<0.0001) | >99.9 (<0.0001) |

TABLE 5

| | Test Condition 1 — Reactive Agent (combination and blending ratio of materials) | | | Test Condition 2 — Baking | | Reaction Temperature (° C.) Oxygen Concentration (vol %) | Kind and Concentration of Fluorine Compound (vol %) | | Test Results — Decomposition Ratio of Fluorine Compound Gas in Treated Gas after Aging (%), Fluorine Ion Concentration in ( ) and CO Concentration in [ ], (vol %) | | | | |
|---|---|---|---|---|---|---|---|---|---|---|---|---|---|
| Example | Composition (combination of materials) | Blending Ratio (mass ratio of materials) | Binder | Temperature (° C.) | Amount of Reactive Agent (ml) | | | | 1 Hr | 2 Hr | 3 Hr | 4 Hr | 5 Hr |
| 29 | $Al_2O_3$-a/$CaCO_3$-a | 0.30/0.70 | I | 550 | 35 | 200 3.5 | $CHClF_2$ | 0.5 | >99.9 | >99.9 | >99.9 | >99.9 | >99.9 |
| 30 | $Al_2O_3$-a/$CaCO_3$-a | 0.30/0.70 | I | | | 350 3.5 | $CHF_3$ | 0.5 | >99.9 | >99.9 | >99.9 | >99.9 | >99.9 |
| 31 | $Al_2O_3$-a/$CaCO_3$-a | 0.30/0.70 | I | | | 200 3.5 | $C_2F_4$ | 0.5 | >99.9 | >99.9 | >99.9 | >99.9 | >99.9 |

TABLE 5-continued

| | Test Condition 1 | | | Test Condition 2 | | | | | | | |
|---|---|---|---|---|---|---|---|---|---|---|---|
| | Reactive Agent (combination and blending ratio of materials) | | | Baking Temperature (° C.) Amount of Reactive Agent | Reaction Temperature (° C.) Oxygen Concentration | Kind and Concentration of Fluorine Compound | Test Results Decomposition Ratio of Fluorine Compound Gas in Treated Gas after Aging (%), Fluorine Ion Concentration in ( ) and CO Concentration in [ ], (vol %) | | | | |
| Example | Composition (combination of materials) | Blending Ratio (mass ratio of materials) | Binder | (ml) | (vol %) | (vol %) | 1 Hr | 2 Hr | 3 Hr | 4 Hr | 5 Hr |
| 32 | Al₂O₃-a/CaCO₃-a | 0.30/0.70 | I | | 300 3.5 | C₂HClF₄ 0.5 | >99.9 | >99.9 | >99.9 | >99.9 | >99.9 |
| 33 | Al₂O₃-a/CaCO₃-a | 0.30/0.70 | I | | 500 | C₂Cl₂F₄ 0.5 | >99.9 | >99.9 | >99.9 | >99.9 | >99.9 |
| 34 | Al₂O₃-a/CaCO₃-a | 0.30/0.70 | I | | 3.5 | C₂H₂F₄ 0.5 | >99.9 | >99.9 | >99.9 | >99.9 | >99.9 |
| 35 | Al₂O₃-a/CaCO₃-a | 0.30/0.70 | I | | 200 | C₃HF₇O 0.5 | >99.9 | >99.9 | >99.9 | >99.9 | >99.9 |
| 36 | Al₂O₃-a/CaCO₃-a | 0.30/0.70 | I | | 3.5 | C₃F₇O 0.5 | >99.9 | >99.9 | >99.9 | >99.9 | >99.9 |
| 37 | Al₂O₃-a/CaCO₃-a | 0.30/0.70 | I | | 600 3.5 | C₄F₈ 0.5 | >99.9 | >99.9 | >99.9 | >99.9 | >99.9 |
| 38 | Al₂O₃-a/CaCO₃-a | 0.30/0.70 | I | | 500 3.5 | C₅F₈ 0.5 | >99.9 | >99.9 | >99.9 | >99.9 | >99.9 |
| 39 | Al₂O₃-a/CaCO₃-a | 0.30/0.70 | I | | 600 3.5 | SF₆ 0.5 | >99.9 | >99.9 | >99.9 | >99.9 | >99.9 |
| 40 | Al₂O₃-a/CaCO₃-a | 0.30/0.70 | I | | 650 3.5 | CF₄ 3.0 | 96.0 | 94.3 | 91.3 | 76.5 | 65.5 |

TABLE 6

| | Test Condition 1 | | | Test Condition 2 | | | Test Results | | | | |
|---|---|---|---|---|---|---|---|---|---|---|---|
| | Reactive Agent (combination and blending ratio of materials) | | | Baking Temperature (° C.) Amount of Reactive Agent | Reaction Temperature (° C.) Oxygen Concentration | Kind and Concentration of Fluorine Compound | Decomposition Ratio of Fluorine Compound Gas in Treated Gas after Aging (%), Fluorine Ion Concentration in ( ) and CO Concentration in [ ], (vol %) | | | | |
| Comparative Example | Composition (combination of materials) | Blending Ratio (mass ratio of respective materials) | Binder | (ml) | (vol %) | (vol %) | 1 Hr | 2 Hr | 3 Hr | 4 Hr | 5 Hr |
| 1 | Al₂O₃-a | 1.0 | I | 550 35 | 650 3.5 | CF₄ 3.0 | >99.9 [<0.001] | 19.7 [<0.001] | — | — | — |
| 2 | Al₂O₃-b | 1.0 | I | 700 35 | 750 0 | CF₄ 3.0 | >99.9 [<0.005] | 47.8 [0.003] | 40.8 [<0.001] | 38.3 | — |
| 3 | Al₂O₃-a/MnO₂ | 0.30/0.70 | I | 550 35 | 700 3.5 | CF₄ 3.0 | 8.5 | 3.0 | — | — | — |
| 4 | Al₂O₃-a/Fe₂O₃ | 0.30/0.70 | I | 550 35 | 700 3.5 | CF₄ 3.0 | 43.4 | 32.3 | — | — | — |

EXAMPLE 41

A silicon oxide film was etched using an etching gas comprising 20 sccm of $CF_4$, 20 sccm of $CHF_3$ and 400 sccm of argon gas. A part of the gas discharged from this dry etching step was introduced using a nitrogen carrier gas into an apparatus shown in FIG. 1 filled with the same reactive agent as in Example 23. A gas at the outlet of the decomposition apparatus was sampled 3 hours after the initiation of the decomposition test and analyzed by gas chromatography. As a result, the concentrations of $CF_4$ and $CHF_3$ both were 10 vol ppm or less and the CO concentration was also 10 vol ppm or less. The fluorine ion concentration was analyzed by water extraction ion chromatography and then found to be 1 vol ppm or less.

As described herein, when the reactive agent of the present invention is used, fluorine compounds can be efficiently decomposed at a relatively low temperature by a simple formulation and the fluorine generated upon decomposition can be fixed as a harmless substance. In other words, the present invention can be implemented using a simple decomposition apparatus by a simple treatment operation. The decomposition efficiency is high and when oxygen is allowed to be present together, the generation of carbon monoxide can also be controlled. Moreover, the decomposition product becomes a stable alkaline earth metal fluoride such as $CaF_2$, therefore, the after-treatment is easy. Also, the effect on the reduction in costs for the reactive agent is by far higher. In particular, the present invention can greatly contribute to the decomposition of used fluorine compounds generated in the manufacturing process of semiconductor devices.

While the invention has been described in detail and with reference to specific embodiments thereof, it will be apparent to one skilled in the art that various changes and modifications can be made therein without departing from the spirit and scope thereof.

What is claimed is:

1. A reactive agent for decomposing fluorine compounds, consisting essentially of alumina, a carbonate of magnesium, calcium, strontium or barium, and at least one oxide of a metal selected from the group consisting of copper and tin, wherein the carbonate and oxide are in powder form.

2. The reactive agent for decomposing fluorine compounds as claimed in claim 1, wherein said alumina has a specific surface area of 50 m$^2$/g or more.

3. The reactive agent for decomposing fluorine compounds as claimed in claim 1 or 2, wherein said alumina is pseudo boehmite alumina.

4. The reactive agent for decomposing fluorine compounds as claimed in claim 1 or 2, wherein said alumina is obtained by baking pseudo boehmite alumina at a baking temperature of from 400 to 1,000° C.

5. The reactive agent for decomposing fluorine compounds as claimed in claim 1 or 2, wherein the alumina and the carbonate present in said reactive agent each is in the form of powder having a particle size of 100 μm or less.

6. The reactive agent for decomposing fluorine compounds as claimed in claim 1 or 2, wherein the alumina and the carbonate are present in said reactive agent at a mass ratio of from 1:9 to 1:1.

7. The reactive agent for decomposing fluorine compounds as claimed in claim 1 or 2, wherein the content of said metal oxide is from 1:99 to 5:95 in terms of a ratio to the total mass of said alumina and said carbonate of magnesium, calcium, strontium or barium.

8. The reactive agent for decomposing fluorine compounds as claimed in claim 1 or 2, which has an alkali metal content of 0.1 mass % or less.

9. The reactive agent for decomposing fluorine compounds as claimed in claim 1 or 2, which is a granular product obtained by baking at a temperature of from 400 to 700° C.

10. The reactive agent for decomposing fluorine compounds as claimed in claim 9, which is a granular product having a particle size of from 0.5 to 10 mm.

11. The reactive agent for decomposing fluorine compounds as claimed in claim 1 or 2, which has a water content of 1 mass % or less.

12. The reactive agent for decomposing fluorine compounds as claimed in claim 1, wherein said carbonate is calcium carbonate.

* * * * *